United States Patent [19]

Yater et al.

[11] Patent Number: 4,860,862

[45] Date of Patent: * Aug. 29, 1989

[54] CLUTCH/BRAKE UNIT WITH SELF-CONTAINED ACTUATING PUMP SYSTEM

[75] Inventors: Jerry L. Yater; Stephen L. Carmichael, both of Hamilton, Ohio

[73] Assignee: Force Control Industries, Inc., Fairfield, Ohio

[*] Notice: The portion of the term of this patent subsequent to Apr. 26, 2005 has been disclaimed.

[21] Appl. No.: 182,341

[22] Filed: Apr. 18, 1988

Related U.S. Application Data

[63] Continuation-in-part of Ser. No. 880,189, Jun. 30, 1986, Pat. No. 4,739,865.

[51] Int. Cl.$^4$ .............................................. F16D 67/04
[52] U.S. Cl. ................................ 192/18 A; 192/113 A
[58] Field of Search ....................... 192/18 A, 86, 58 C, 192/12 C, 87.17, 87.18, 113 B, 113 A; 188/151 R; 418/61.3, 64, 181

[56] References Cited

U.S. PATENT DOCUMENTS

| 2,475,242 | 7/1949 | Iavelli | 418/181 X |
|---|---|---|---|
| 2,775,330 | 12/1956 | Schjolin et al. | 192/87.18 X |
| 3,277,833 | 10/1966 | Hudgens | 418/64 X |
| 3,330,391 | 7/1967 | Mamo | 192/113 B X |
| 3,453,966 | 7/1969 | Eddy | 418/54 |
| 3,529,617 | 9/1970 | Huber | 418/61.3 X |
| 3,618,425 | 11/1971 | Wickman | 192/18 A X |
| 3,638,773 | 2/1972 | Lewis et al. | 192/113 B X |
| 3,696,898 | 10/1972 | Sommer | 192/113 A X |
| 3,834,502 | 9/1974 | Sommer | 192/18 A X |
| 3,924,715 | 12/1975 | Cory | 192/18 A |
| 4,420,292 | 12/1983 | Lutz | 418/61.3 X |
| 4,607,736 | 8/1986 | Kelley | 192/18 A |
| 4,639,202 | 1/1987 | Mahanay et al. | 418/61.3 X |
| 4,693,350 | 9/1987 | Sommer | 192/18 A |
| 4,739,865 | 4/1988 | Yater et al. | 192/18 A |

FOREIGN PATENT DOCUMENTS 1728617 2/1977 Fed. Rep. of Germany ..... 418/61.3

Primary Examiner—Rodney H. Bonck
Attorney, Agent, or Firm—Jacox & Meckstroth

[57] ABSTRACT

A housing encloses a supply of oil and has opposite end portions supporting axially aligned input and output shafts. Interfitting annular clutch plates and discs provide for connecting the input shaft to the output shaft, and interfitting annular brake plates and discs provide for braking the output shaft to the housing in response to axial movement of a non-rotating oil actuated piston supported within the housing concentrically with the output shaft. Oil recirculating structure is provided within the housing for cooling and lubricating the plates and discs, and a positive displacement high pressure annular pump forms an extension of the housing around the inlet shaft. The pump has inner and outer thin flat rotors and pressurizes a portion of the oil within the housing sufficiently to actuate the piston through the control of a solenoid actuated valve unit mounted on the housing. Flat annular wear plates are spaced to confine the rotors and have arcuate passages adjacent the teeth on the rotors.

19 Claims, 3 Drawing Sheets

CLUTCH/BRAKE UNIT WITH SELF-CONTAINED ACTUATING PUMP SYSTEM

RELATED APPLICATION

This application is a continuation-in-part of application Ser. No. 880,189, filed June 30, 1986 and now U.S. Pat. No. 4,739,865.

BACKGROUND OF THE INVENTION

In an oil shear clutch-brake unit of the general type disclosed in U.S. Pat. Nos. 3,638,773 and 3,924,715, which issued to the assignee of the present application, it is sometimes inconvenient to provide a supply of pressurized air from a remote air compressor to actuate the internal piston within the unit. It is also sometimes difficult to obtain a source of clean dry pressurized air for actuating the piston since it is not uncommon for moisture and dirt to collect within the air lines of a manufacturing plant. If the air supply contains moisture, the moisture can produce rust within the clutch-brake unit, especially if no oil is introduced into the air supply and the unit is not operated for an extended period of time. If the air supply contains dirt particles, the particles can prevent smooth operation of the piston and result in excessive wear.

In the art of oil shear clutch and/or brake units with non-rotating actuating pistons, it is known to operate the piston with hydraulic fluid in place of air, especially if a hydraulic pressure line is readily available, for example, from a remote hydraulic pump used to drive hydraulic motors or actuators on the equipment where the clutch and/or brake unit is being used. However, there are many applications and uses for an oil shear clutch and/or brake unit where the supply of clean dry air or hydraulic fluid is not available and would involve significant additional costs to be made available. In such installations, an electrically actuated clutch and/or brake unit may be employed, but such a unit does not offer the important advantages of an oil shear clutch and/or brake unit as disclosed in the above mentioned patents.

SUMMARY OF THE INVENTION

The present invention is directed to an improved oil shear clutch/brake unit or variable speed drive unit of the general type as disclosed in the above-mentioned U.S. Patents and which provides a self-contained system for operating the unit with only an electrical power supply and without the need for a fluid supply line such as a pneumatic line from an air compressor or a hydraulic line from a remote hydraulic pump. Thus the apparatus of the invention greatly simplifies the installation of an oil shear clutch/brake unit or variable speed drive unit and eliminates the possibility of any problem occurring due to an air supply line with dirt and/or moisture. The apparatus of the invention also eliminates the need for having a plumber install fluid lines to the unit and assures rapid operation of the unit in response to actuation of the electrical controls.

In accordance with one embodiment of the invention, a shaft extends into one end portion of the housing of a clutch/brake unit and is surrounded by a compact annular hydraulic pump system which includes a pump housing or body forming an extension of the clutch/brake housing. The annular pump housing or body encloses positive displacement pumping elements including a set of inner and outer rotors formed by flat gear-like members. The inner rotor is secured to the shaft for common rotation and has external teeth which mesh with internal teeth on the outer rotor located eccentrically to the shaft axis. The outer rotor has one more tooth than the inner rotor and is supported for rotation by a surrounding wear plate retained within the pump housing.

Inlet and outlet passages are formed within the pump body, and/or hardened wear plates on opposite sides of the rotors, and the inlet passage receives a portion of the cooling oil collected within the lower portion of the unit housing. The outlet passage connects with passages within the unit housing for directing high pressure hydraulic fluid to the non-rotating piston through a manifold and a solenoid actuated control valve mounted on the housing of the unit. The self-contained positive displacement pump produces high pressure fluid in either direction of shaft rotation, and pressure relief valves are provided to limit the maximum hydraulic pressure and for selecting the pressures which operate the clutch and brake according to the desired torque transmission.

Other features and advantages of the invention will be apparent from the following description, the accompanying drawings and the appended claims.

DESCRIPTION OF THE PREFERRED EMBODIMENTS

Figure 1:
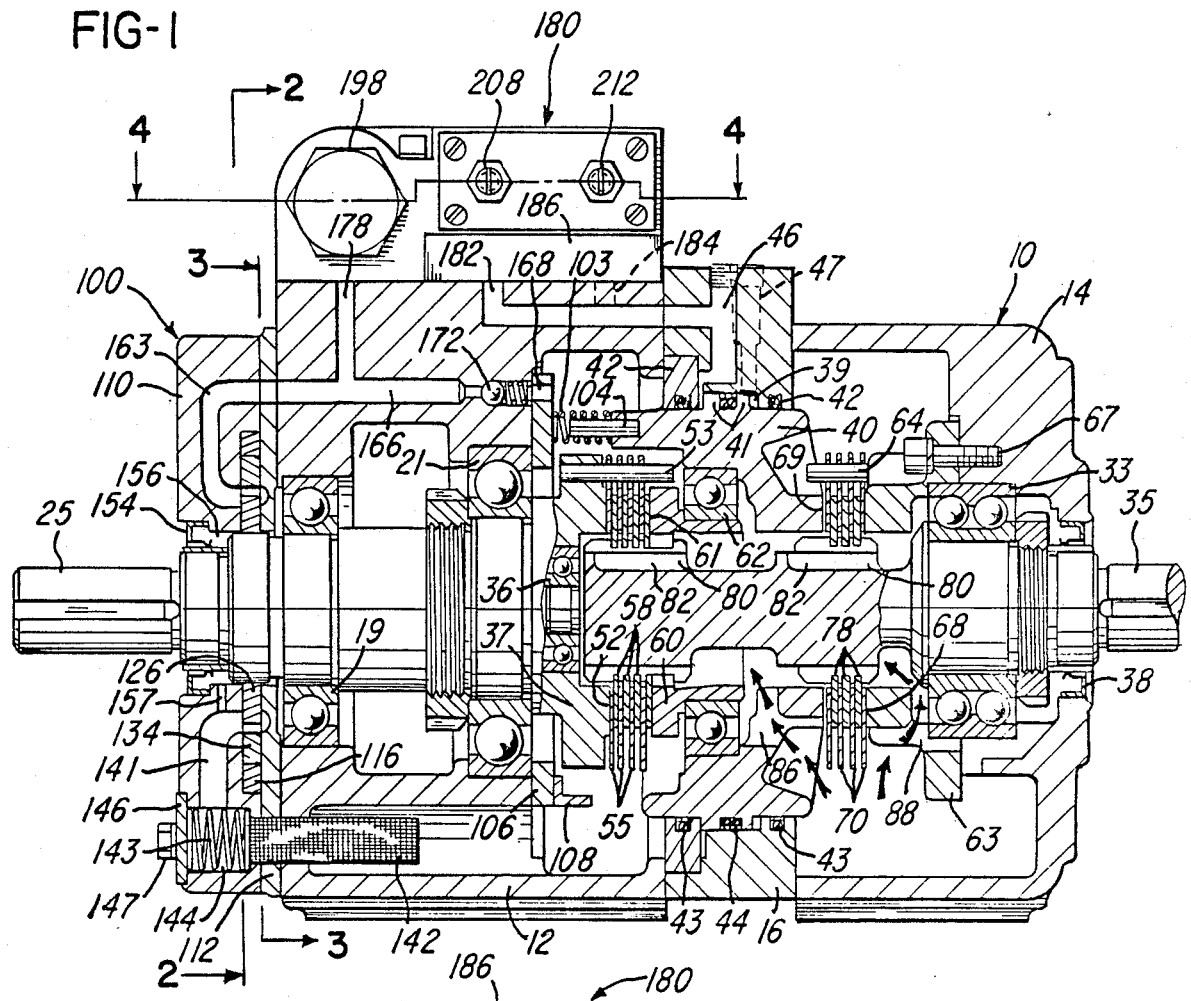
FIG. 1 is an axial section of an oil shear clutch-brake unit incorporating a self-contained hydraulic actuating pump in accordance with the invention.
Figure 2:
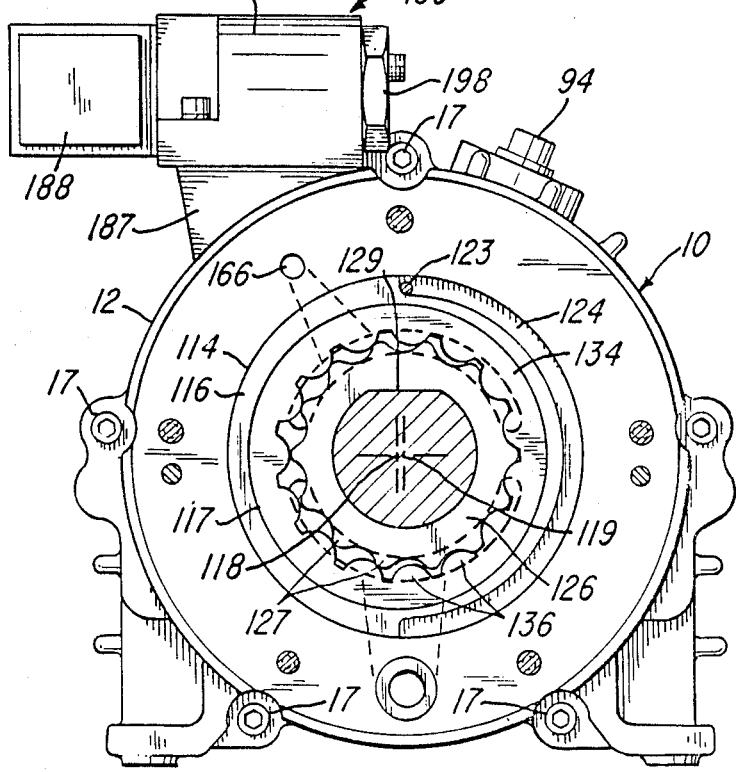
FIG. 2 is a view of the clutch-brake unit as taken generally on the line 2—2 of FIG. 1.

The clutch-brake unit shown in FIGS. 1 and 2, includes a cast metal housing 10 formed by a first or input end portion 12, a second or output end portion 14 and an intermediate portion 16 positioned between the end portions 12 and 14. The end portions 12 and 14 and the intermediate portion 16 are secured or clamped together by a seires of peripherally spaced and axially extending screws 17 (FIG. 2). The end portion 12 of the housing 10 has a set of counterbores which receive a set of axially spaced antifriction ball bearings 19 and 21, and an input shaft 25 is rotatably supported by the bearings in a manner similar to that shown in above-mentioned U.S. Pat. No. 3,924,715. The input shaft 25 is adapted to be driven continuously by some form of a prime mover such as an electric motor.

The output end portion 14 of the housing 10 has a counterbore which retains an antifriction ball bearing 33 for supporting an intermediate portion of an output shaft 35. The output shaft 35 is adapted to be connected to drive a machine which requires intermittent starting and stopping. The inner end portion of the output shaft 35 is supported by an antifriction ball bearing 36 which is retained within a counterbore formed within an enlarged inner end portion 37 of the input shaft 25. An annular rotating seal assembly 38 is retained by the output end portion 14 of the housing 10, and the seal assembly 38 engages a low friction metal sleeve on the output shaft 35 to form a fluid-tight seal for retaining a supply of oil within the housing 10.

The intermediate portion 16 of the housing 10 projects inwardly and forms an annular cylindrical chamber 39 positioned concentrically with the output shaft 35. A non-rotating annular piston 40 includes axially spaced rib portions 41 positioned within the chamber 39 for axial sliding movement, and the piston is confined by a ring 42 retained within a counterbore in the housing portion 16. A set of O-rings 43 are retained within corresponding grooves formed within the intermediate housing portion 16 and the ring 42 and cooperate with corresponding low friction plastic bands to form fluid-tight seals with the adjacent corresponding cylindrical surfaces of the piston 40.

Another set of O-rings 44 and a plastic band are retained within a peripheral groove defined between the ribs 41 of the piston 40 and form a fluid-tight seal with the cylindrical surface defining the chamber 39. A set of circumferentially spaced passages 46 and 47 are formed within the intermediate housing portion 16 to provide for selectively supplying a hydraulic fluid or oil (as will be explained later) to the chamber 39 on opposite sides of the piston ribs 41 so that the piston 40 may be selectively moved in opposite axial directions within the housing 10.

The inner annular portion 37 of the input shaft 25 has a radial thrust surface 52 and supports a series of peripherally spaced and axially extending pins 53. A series of flat annular clutch plates 55 are supported by the pins 53 for rotation with the input shaft 25 and are interfitted between a series of clutch discs 58 splined to the outer surface of the output shaft 25 for rotation with the output shaft. An annular clutch member 60 is also splined to the outer surface of the output shaft 35 for axial movement relative to the output shaft and has a radial thrust surface 61 opposing the surface 52 on the input shaft portion 37. The clutch member 60 receives the inner race of an artifriction support bearing 62 which has an outer race confined within a counterbore formed within the piston 40.

The output end portion 14 of the housing 10 supports a collar or ring 63 which has a plurality of inwardly projecting pins 64 and is secured by a set of peripherally spaced screws 67. The ring 63 has an inwardly facing radial thrust surface 68 which opposes a radial surface 69 of an inner annular portion of the piston 40. A series of annular non-rotating brake plates 70 are positioned between the opposing thrust surfaces 68 and 69 and are supported by the pins 64. The pins 64 extend into corresponding cavities within the piston 40 to prevent rotation of the piston. The brake plates 70 interfit between a corresponding series of brake discs 78 which are splined to the outer surface of the output shaft 35.

The output shaft 35 includes a set of integrally cast and longitudinally spaced elongated impellers 80. Each impeller 80 has a plurality of four axially extending arcuate passages 82 which are peripherally spaced between arcuate ribs splined to the discs. The passage 82 have corresponding arcuate inlets facing in the same direction toward the end portion 14 of the housing. The passages 82 of one impeller 80 extend through the annular clutch discs 58, and the passages 82 of the other impeller 80 extend through the brake discs 78. The oil within the housing 10 is directed to the inlets of the impellers 80 through a plurality of circumferentially spaced passages 86 and 88 defined within the piston 40 and within the ring 63, respectively.

During operation of the clutch-brake unit, some of the oil which collects within the input end portion 12 of the housing 10 flows to the output end portion 14 through a set of lower corner passages (not shown) located within the intermediate portion 16 of the housing 10. A set of axially spaced inspection and oil fill ports (FIG. 2) and removable plugs 94 are provided within the upper portion of the housing 10 to provide for adding oil into the housing 10 and for checking the static level of the oil which is generally near the axis of the shafts 25 and 35. The positive outward flow of oil between the clutch plates and discs during starting of the output shaft 35 and between the brake plates and discs during stopping of the shaft 35, is highly desirable for minimizing wear of the plates and discs and for cooling the plates and discs.

In accordance with the present invention, the piston 40 is actuated by hydraulic fluid supplied to the chamber 39 from a positive displacement hydraulic pump 100. When high pressure hydraulic fluid or oil is supplied through the passage 46, the oil pressure urges the piston 40 towards the right (FIG. 1) to brake the output shaft 35 by compressing together the interfitting brake plates 70 and brake disks 78. The piston 40 is normally urged toward the braking position by a set of circumferentially spaced compression springs 103 mounted on corresponding pins 104 projecting axially from the piston 40. The springs 103 engage an annular plate 106 which also retains the outer race of the bearing 21. The lower portion of the ring 106 supports an arcuate baffle member 108 which reduces turbulence of the oil collected within the lower portion of the housing 10.

Figure 3:
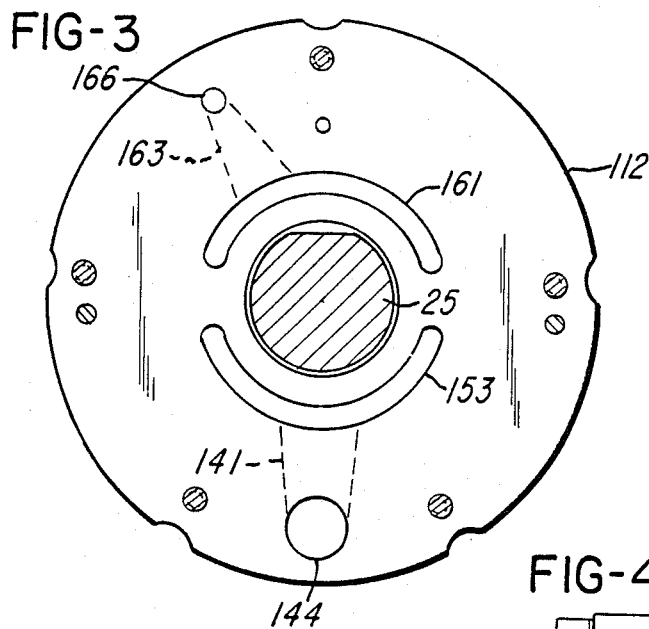
FIG. 3 is a section taken generally on the line 3—3 of FIG. 1.

As shown in FIGS. 1-3, the hydraulic pump 100 includes an annular pump housing 110 and an annular steel wear plate 112 which mount on the housing 10 and form an extension of the housing 10 around the input shaft 25. The pump housing 110 has a cylindrical cavity 114 (FIG. 2) which receives a ring 116 having a cylindrical inner surface 117 with a center axis 118 located eccentrically with respect to the center axis 119 of the shafts 25 and 35. The ring 116 is free to rotate 180°, and the limits of clockwise and counterclockwise rotation of the ring 116 are determined by a stop pin 123 located within a semi-circular groove 124 formed within the outer surface of the ring 116.

The pump 100 also includes an inner gear-like rotor 126 (FIG. 2) which has fourteen peripherally spaced teeth 127. The inner rotor 126 is secured to the input shaft 25, and mating flat surfaces at 129 assure rotation of the inner rotor 126 with the input shaft 25. Surrounding the inner rotor 126 is an outer rotor 134 which is free to rotate within the cylindrical bore 117 of the ring 116. The outer rotor 134 has fifteen circumferentially spaced inner teeth 136 or one more tooth than the inner rotor 126.

Hydraulic fluid or oil is supplied to the pump 100 through a suction inlet passage 141 (FIG. 1) and a wire suction strainer 142 which projects into the lower portion of the housing 10. The strainer 142 and a retaining spring 143 are removable for cleaning of the strainer through a connecting chamber 144 which is normally closed by an oval plate 146 secured to the housing 110 by a pair of screws 147.

The inlet passage 141 connects with the space between gear teeth 127 and 136 and also with an arcuate cavity 153 (FIG. 3) within the lower portion of the wear plate 112. A sealing ring 154 is retained by the pump housing 110 and encloses an annular chamber 156 which surrounds the input shaft 125 and is connected by small passage 157 to the inlet passage 141. The upper portion of the wear plate 112 has an arcuate cavity 161 (FIGS. 2 and 3) which connects with a high pressure outlet passage 163 formed within the upper portion of the pump housing. The passage 163 connects with an axially extending passage 166 (FIGS. 1 and 3) which extends through the wear plate 112 and into the housing 10. The inner end of the passage 166 connects with a passage 168 within the annular plate 106, and a pressure relief valve 172, having a spring bias ball, is located within the passage 168.

The inner rotor 126 and the outer rotor 134 of the pump 100 are manufactured for positive displacement pump applications by the Nichols Company of Portland, Maine and are sold under the trademark of THE GEROTOR. The pump 100 is effective to produce a flow rate of oil of approximately two gallons per minute at a shaft speed of approximately 1800 R.P.M. The pressure relief 172 is selected to provide a maximum hydraulic pressure within the passage 166, for example, 250 p.s.i. Above this pressure, the valve 172 opens sufficiently to allow oil to recirculate through the passage 168 and back into the housing 10 where the oil is collected in the lower portion of the housing. The small quantity of oil which seeps inwardly pass the inner rotor 126 returns to the suction inlet passage 141 through the port 157.

Figure 4:
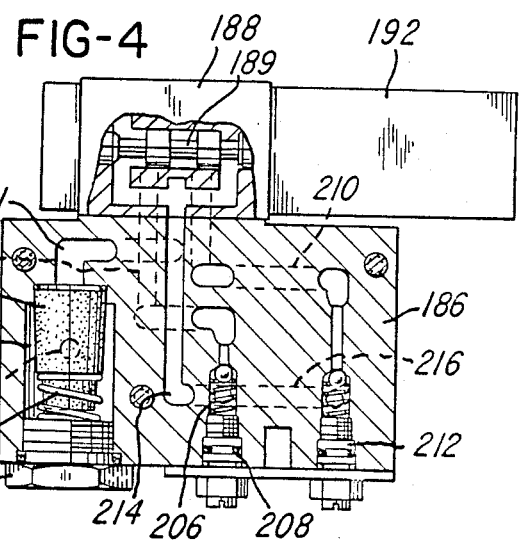
FIG. 4 is a fragmentary section taken generally on the line 4—4 of FIG. 1.

A radial passage 178 (FIG. 1) is formed within the housing 10 and connects with the pump outlet passage 166 to direct the high pressure oil to a control valve system 180. The valve system 180 selectively controls the flow of high pressure oil to either the passage 46 for actuating the brake or to the passage 47 for actuating the clutch through correspondingly connecting passage 182 and 184 formed within the housing 10. The valve control system 180 includes a block-like manifold 186 (FIG. 4) which mounts on a projection 187 of the housing section 12. The manifold supports a two position, four way valve 188 which has a valve member 189 reciprocated or actuated by a solenoid 192. The solenoid actuated valve 188 is commercially available.

Figure 5:
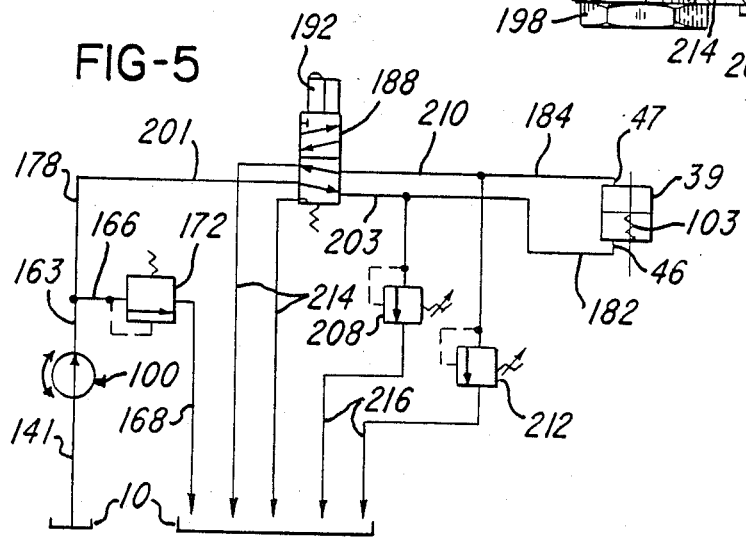
FIG. 5 is a diagrammatic illustration of the hydraulic control system used on the clutch-brake unit shown in FIGS. 1-4.

A cylindrical chamber 194 (FIG. 4) is formed within the manifold 186 and connects with the passage 178 within the housing portion 12 so that the chamber 194 receives high pressure oil from the pump 100. A sintered bronze filter 196 is retained within the chamber 194 by a compression spring 197 and a threaded plug 198. The filtered oil is directed through a passage 201 within the manifold 186 to the inlet port of the valve 188. One outlet port of the valve 188 is connected by a passage 203 to a chamber 206 which has an adjustable pressure relief valve 208. The passage 203 is also connected to the passage 182 within the housing 10 and to the passage 46 for moving the piston 40 in a direction to apply the brake. Another passage 210 within the manifold 186 connects the other outlet port of the valve 188 to another adjustable pressure relief valve 212 and also to the passages 184 and 47 within the housing 10. As shown in FIG. 5, oil return passages 214 and 216 connect the valve 188 and the valves 208 and 212 back to the oil receiving chamber within the housing 10.

In operation of the clutch-brake unit described above, the input shaft 25 is driven at a constant speed in a clockwise or a counterclockwise direction. The pump 100 produces a continuous high pressure flow in either direction, for example, at two gallons per minute. The pressure relief valve 172 within the pump outlet passage 166 maintains a predetermined constant pressure within the passages 166 and 178, for example, a pressure of 250 p.s.i. When the oil pressure within the passage 166 exceeds this limit, the valve 172 opens so that the oil is recirculated back into the housing 10. When the solenoid 192 of the control valve system 180 is deenergized (FIG. 5), the pressurized oil from the pump 100 flows through the valve 188 to the passages 203, 182 and 46 to pressurize the piston 40 and move it to the right (FIG. 1) to compress the rotating brake discs 78 against the non-rotating brake plates 70 for stopping the output shaft 35. The amount of braking pressure applied by the piston 40 may be precisely selected by adjusting the pressure relief valve 208. If the oil pressure exceeds the selected pressure, the valve opens and permits oil to return to the housing 10 through the passage 216.

When it is desired to release the brake and actuate the clutch of the clutch-brake unit to couple the input shaft 25 to the output shaft 35, the solenoid 192 is energized. The pressurized oil within the passsages 178 and 201 is directed through the passages 210, 184 and 47 for pressurizing the chamber 39 on the right side of the piston ribs 41 and thereby shift the piston 40 to the left (FIG. 1) against the springs 103 for clamping the interfitting clutch plates 55 and discs 58 together. The torque transmitted through the clutch plates and discs may be precisely selected by adjusting the pressure relief valve 212. When the pressure exceeds the selected pressure, the valve 212 opens, and oil is returned to the housing 10 through the passage 216. As shown in FIG. 5, when one of the passages 203 or 210 is pressurized, the other passage is connected to the return passage 214 by the valve 188 so that the hydraulic pressure within the chamber 39 on the opposite side of the piston ribs 41 is released.

Figure 6:
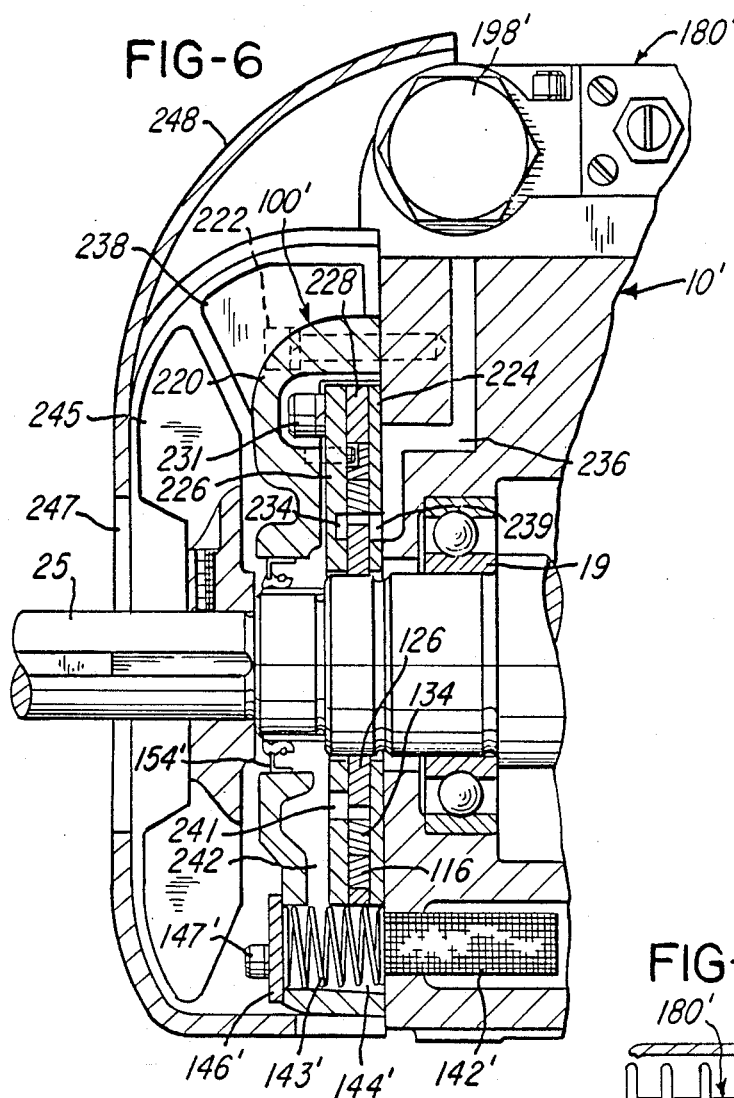
FIG. 6 is a fragmentary section and showing a modification of the unit shown in FIG. 1.
Figure 7:
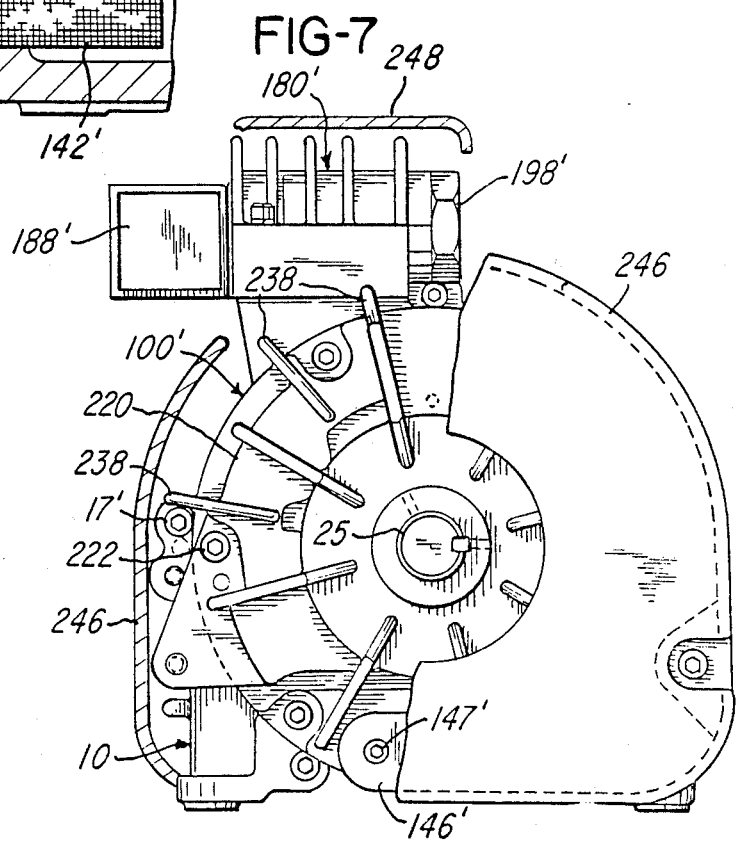
FIG. 7 is an end elevational view of the modified unit of FIG. 6 and with portions broken away.

A modification of the clutch-brake unit described above in connection with FIGS. 1-5 is shown in FIG. 6 and 7. In this modification, which is primarily described with the same reference numbers having a prime mark, a high pressure hydraulic pump 100' includes a pump housing or body 220 which is mounted on the clutch-brake unit housing 10' and secured directly to the housing by a set of peripherally spaced screws 222. The pump housing 220 encloses an inner wear plate 224 and an outer wear plate 226 which are spaced apart by a spacer ring 228 by a distance slightly greater than the thickness of the flat inner gear rotor 126 and outer gear rotor 134. The ring 116 is supported for limited rotation within the spacer ring 228 in the same manner as described above, and a sub-assembly of the wear plates 224 and 226, rotors 126 and 134 and rings 116 and 228 are secured to the housing 10' by a set of peripherally spaced screws 231.

The inner wear plate 224 has an arcuate slot 239 which is located adjacent the teeth 127 and 136 on the rotors 126 and 134 and which connects with a passage 236 within the housing 10'. The passage 236 extends to the control valve system 180' which is constructed substantially the same as the control valve system 180. The pressure relief passage 166 and valve 172 described above in connection with FIG. 1, are omitted in the modification shown in FIG. 6 since the internal leakage within the high pressure pump 100' is effective to limit the maximum pressure produced within the passage 236 to about 250 psi.

The pump housing 220 is preferably formed or cast of aluminum and includes circumferentially spaced and radially extending cooling ribs 238 which are cast as integral parts of the pump body 220. A ring seal 154' is confined within the pump body 220 and engages a hardened sleeve on a cylindrical portion of the input shaft 25 in the same manner as the ring seal 154 mentioned above. The outer wear plate 226 has an upper arcuate cavity 234 which opposes the slot 239 and has a lower arcuate inlet slot 241. The lower portion of the pump body 220 has an inlet passage 242 which connects the slot 241 to the chamber 144' within the pump body 220. The chamber 144' receives the filter 142' and coil spring 143' which are retained within the chamber 144' by the plate 146' and screws 147' in the same manner as described above in connection with FIG. 1.

The input shaft 25 also supports a cooling fan blande 245 which is surrounded by an annular fan housing or cowling 246 which also extends partially around the pump body 220. The cowling 246 has a circular air inlet 247 and a top curve deflector portion 248 which extends above the control valve system 180'. When the fan blade 245 is rotating with the input shaft 25, cooling air is circulated over the pump housing or body 220 and also over the valve system 180' and the clutch-brake unit housing 10'.

From the drawings and the above description, it is apparent that a clutch-brake unit constructed in accordance with the invention, provides desirable features and advantages. For example, as one advantage, the unit may be installed and used in applications where there is no source of pressurized air or pressurized hydraulic fluid or where the pressurized air is not clean and dry. The unit carries its own self-contained hydraulic pump which is compact and provides a positive output pressure. The pump 100 or 100' also operates in either direction of rotation of the input shaft 25 since the ring 116 rotates 180 degrees due to friction when the direction of rotation of the rotors 126 and 134 is reversed. The pump also uses the oil supply which is recirculated within the clutch-brake unit for cooling and lubricating the clutch plates and discs and the brake plates and discs. The hydraulic control system 180 or 180' further provides for conveniently selecting the torque transmitted through the clutch and through the brake and also co-operates with the compact pump 100 or 100' to provide rapid response of movement of the piston 40 and corresponding actuation of either the clutch or the brake. It is also apparent that the actuating pump 100 or 100' and a control system similar to the system 180 or 180' may be used on an oil shear clutch only unit or on a variable speed oil shear drive unit when a self-contained actuating system is desired.

While the forms of apparatus herein described constitute preferred embodiments of the invention, it is to be understood that the invention is not limited to these precise forms of apparatus, and that changes may be made therein without departing from the scope and spirit of the invention as defined in the appended claims.

The invention having thus been described, the following is claimed:

1. Apparatus comprising a housing having means for containing a supply of oil, an input shaft and an output shaft rotatably supported within said housing on a common axis of rotation, a series of interfitting clutch plates and clutch discs within said housing, said clutch plates mounted on said input shaft for rotation therewith and the interfitting said clutch discs mounted on said output shaft for rotation therewith, a piston supported within said housing for axial movement, means connected to said housing and cooperating said said piston to define a clutch pressure chamber, means connected to said piston for applying an axially compressive force to said series of clutch plates and discs in response to movement of said piston in one axial direction to couple said input shaft with said output shaft, means for recirculating oil within said housing and between said plates and discs, a high pressure hydraulic gear pump including a pump body supported by said housing and enclosing a substantially flat inner rotor secured to said input shaft for rotation therewith, a generally flat outer rotor surrounding said inner rotor, said inner and outer rotors connected by intermeshing teeth, said outer rotor having a rotary axis eccentric to said axis of said shaft, an annular wear plate disposed between said housing and said pump body and engaging said inner and outer rotors, means defining an oil receiving passage within said wear plate adjacent said teeth, means defining an inlet passage for directing oil within said housing to said pump, means defining an outlet passage for directing pressurized oil from said pump to said clutch pressure chamber, valve means connected to control the flow of oil through said outlet passage to said clutch pressure chamber, means for adjusting said valve means to control the hydraulic pressure to said clutch pressure chamber for conveniently selecting the torque transmitted through said clutch plates and discs, said inlet passage being disposed within the lower portions of said housing and said pump body, an oil filter within said inlet passage, and means on said pump body for removing said oil filter.

2. Apparatus as defined in claim 1 and including a cooling fan mounted on said input shaft adjacent said pump body, and cowling means surrounding said fan and cooperating with said fan for directing cooling air from said fan over said pump body and said housing.

3. Apparatus as defined in claim 1 wherein said wear plate has a hardness substantially greater than the hardness of either said housing or said pump body.

4. Apparatus as defined in claim 1 wherein said passage within said wear plate comprises an arcuate slot.

5. Apparatus comprising a housing having means for containing a supply of oil, an input shaft and an output shaft rotatably supported within said housing on a common axis of rotation, a series of interfitting clutch plates and clutch discs within said housing, said clutch plates mounted on said input shaft for rotation therewith and the interfitting said clutch discs mounted on said output shaft for rotation therewith, a piston supported within said housing for axial movement, means connected to said housing and cooperating with said piston to define a clutch pressure chamber, means connected to said piston for applying an axially compressive force to said series of clutch plates and discs in response to movement of said piston in one axial direction to couple said input shaft with said output shaft, means for recirculating oil within said housing and between said plates and discs, a high pressure hydraulic gear pump including a pump body supported by said housing and enclosing a substantially flat inner rotor secured to said input shaft for rotation therewith, a generally flat outer rotor radially surrounding said inner rotor, said inner and outer rotors connected by intermeshing teeth, said outer rotor having a rotary axis eccentric to said axis of said shaft, a set of axially spaced inner and outer annular wear plates disposed between said housing and said pump body and on opposite sides of said inner and outer rotors, means defining an oil receiving passage within at least one of said wear plates adjacent said teeth, means defining an oil inlet passage for directing oil within said housing to said pump, means defining an outlet passage for directing pressurized oil from said pump to said clutch pressure chamber, valve means connected to control the flow of oil through said outlet passage to said clutch pressure chamber, and means for adjusting said valve means to control the hydraulic pressure to said clutch pressure chamber for conveniently selecting the torque transmitted through said clutch plates and discs.

6. Apparatus as defined in claim 5 and including a cooling fan mounted on said input shaft adjacent said pump body, and cowling means surrounding said fan and cooperating with said fan for directing cooling air from said fan over said pump body and said housing.

7. Apparatus as defined in claim 5 wherein each said wear plate has a hardness substantially greater than the hardness of either said housing or said pump body.

8. Apparatus as defined in claim 5 wherein said passage within said one wear plate comprises an arcuate slot.

9. Apparatus as defined in claim 5 and including a ring member within said pump body between said wear plates and supporting said outer rotor for rotation, said ring member having an inner cylindrical surface with a centerline eccentric to said axis of said input shaft, and means supporting said ring member for limited rotation in response to reversing the rotation of said input shaft to provide for producing high pressure fluid with said pump with either direction of rotation of said shaft.

10. Apparatus as defined in claim 5 wherein said inlet passage is disposed within the lower portions of said housing and said pump body, an oil filter within said inlet passage, and means on said pump body for removing said oil filter.

11. Apparatus comprising a housing having means for containing a supply of oil, an input shaft and an output shaft rotatably supported within said housing on a common axis of rotation, a series of interfitting clutch plates and clutch discs within said housing, said clutch plates mounted on said input shaft for rotation therewith and the interfitting said clutch discs mounted on said output shaft for rotation therewith, a piston supported within said housing for non-rotating axial movement, means on said housing and cooperating with said piston to define a clutch pressure chamber, means connected to said piston for applying an axially compressive force to said series of clutch plates and discs in response to movement of said piston in one axial direction to couple said input shaft with said output shaft, means for recirculating oil within said housing and between said plates and discs, a high pressure hydraulic gear pump including a pump body removably attached to said housing and including a rotor secured to said input shaft for rotation therewith, means defining an inlet passage within the lower portions of said housing and said pump body for directing oil within said housing to said pump, an oil filter within said inlet passage, means on said pump body for removing said oil filter, means defining an outlet passage for directing pressurized oil from said pump to said clutch pressure chamber, valve means connected to control the flow of oil through said outlet passage to said clutch pressure chamber, and means for adjusting said valve means to control the hydraulic pressure to said clutch pressure chamber for conveniently selecting the torque transmitted through said clutch plates and discs.

12. Apparatus as defined in claim 11 and including a cooling fan mounted on said input shaft adjacent and pump body, and cowling means surrounding said fan and cooperating with said fan for directing cooling air from said fan over said pump body and said housing.

13. Apparatus comprising a housing having means for containing a supply of oil, an input shaft and an output shaft rotatably supported within said housing on a common axis of rotation, a series of interfitting clutch plates and clutch discs within said housing, said clutch plates mounted on said input shaft for rotation therewith and the interfitting said clutch discs mounted on said output shaft for rotation therewith, a series of interfitting brake plates and brake discs positioned in axially spaced relation to said series of clutch plates and discs, said brake discs mounted on said output shaft for rotation therewith and the interfitting said brake plates being supported for non-rotation by said housing, a piston supported within said housing for non-rotating axial movement, said piston having a portion cooperating with said housing to define a brake pressure chamber and a clutch pressure chamber on opposite sides of said piston portion, means connected to said piston for applying an axially compressive force to said series of clutch plates and discs in response to movement of said piston in one axial direction to couple said input shaft with said output shaft, means for applying an axially compressive force to said series of brake plates and discs in response to movement of said piston in the opposite axial direction for braking said output shaft to said housing, means for recirculating oil within said housing and between said plates and discs, a high pressure hydraulic gear pump including a pump body supported by said housing and enclosing a substantially flat inner rotor secured to said input shaft for rotation therewith and radially surrounded by a generally flat outer rotor, said inner and outer rotors connected by intermeshing teeth, said outer rotor having a rotary axis eccentric to said axis of said shaft, a set of axially spaced inner and outer annular wear plates disposed between said housing and said pump body and on opposite sides of said inner and outer rotors, means defining an arcuate oil receiving passage within at least one of said wear plates adjacent said teeth, means defining an inlet passage for directing oil within said housing to said pump, means defining an outlet passage for directing pressurized oil from said pump to said brake pressure chamber and said clutch pressure chamber, valve means connected to control selectively the flow of oil through said outlet passage to either said brake pressure chamber or said clutch pressure chamber, and means for adjusting said valve means to provide for independently adjusting the hydraulic pressure to either said brake pressure chamber or said clutch pressure chamber for conveniently selecting the torque transmitted through either said brake plates and discs or said clutch plates and discs.

14. Apparatus as defined in claim 13 and including a cooling fan mounted on said input shaft adjacent said pump body, and cowling means surrounding said fan and cooperating with said fan for directing cooling air from said fan over said pump body and said housing.

15. Apparatus as defined in claim 13 wherein each said wear plate has a hardness substantially greater than the hardness of either said housing or said pump body.

16. Apparatus as defined in claim 13 wherein said passage within said wear plate comprises an arcuate slot.

17. Apparatus as defined in claim 13 and including a ring member within said pump body between said wear plates and supporting said outer rotor for rotation, said ring member having an inner cylindrical surface with a centerline eccentric to said axis of said input shaft, and means supporting said ring member for limited rotation in response to reversing the rotation of said input shaft to provide for producing high pressure fluid with said pump with either direction of rotation of said shaft.

18. Apparatus as defined in claim 13 wherein said inlet passage is disposed within the lower portions of said housing and said pump body, an oil filter within said inlet passage, and means on said pump body for removing said oil filter.

19. Apparatus comprising a housing having means for containing a supply of oil, an input shaft and an output shaft rotatably supported within said housing on a common axis of rotation, a series of interfitting clutch plates and clutch discs within said housing, said clutch plates mounted on said input shaft for rotation therewith and the interfitting said clutch discs mounted on said output shaft for rotation therewith, a piston supported within said housing for axial movement, means connected to said housing and cooperating with said piston to define a clutch pressure chamber, means connected to said piston for applying an axially compressive force to said series of clutch plates and discs in response to movement of said piston in one axial direction to couple said input shaft with said output shaft, means for recirculating oil within said housing and between said plates and discs, a high pressure hydraulic gear pump including a pump body supported by said housing and enclosing a substantially flat inner rotor secured to said input shaft for rotation therewith, a generally flat outer rotor surrounding said inner rotor, said inner and outer rotors connected by intermeshing teeth, said outer rotor having a rotary axis eccentric to said axis of said shaft, an annular wear plate disposed between said housing and said pump body and engaging said inner and outer rotors, means defining an oil receiving passage within said wear plate adjacent said teeth, means defining an inlet passage for directing oil within said housing to said pump, means defining an outlet passage for directing pressurized oil from said pump to said clutch pressure chamber, valve means connected to control the flow of oil through said outlet passage to said clutch pressure chamber, means for adjusting said valve means to control the hydraulic pressure to said clutch pressure chamber for conveniently selecting the torque transmitted through said clutch plates and discs, a ring member within said pump body adjacent said wear plate and supporting said outer rotor for rotation, said ring member having an inner cylindrical surface with a centerline eccentric to said axis of said input shaft, and means supporting said ring member for limited rotation in response to reversing the rotation of said input shaft to provide for producing high pressure fluid with said pump with either direction of rotation of said shaft.

* * * * *